Patented Nov. 7, 1922.

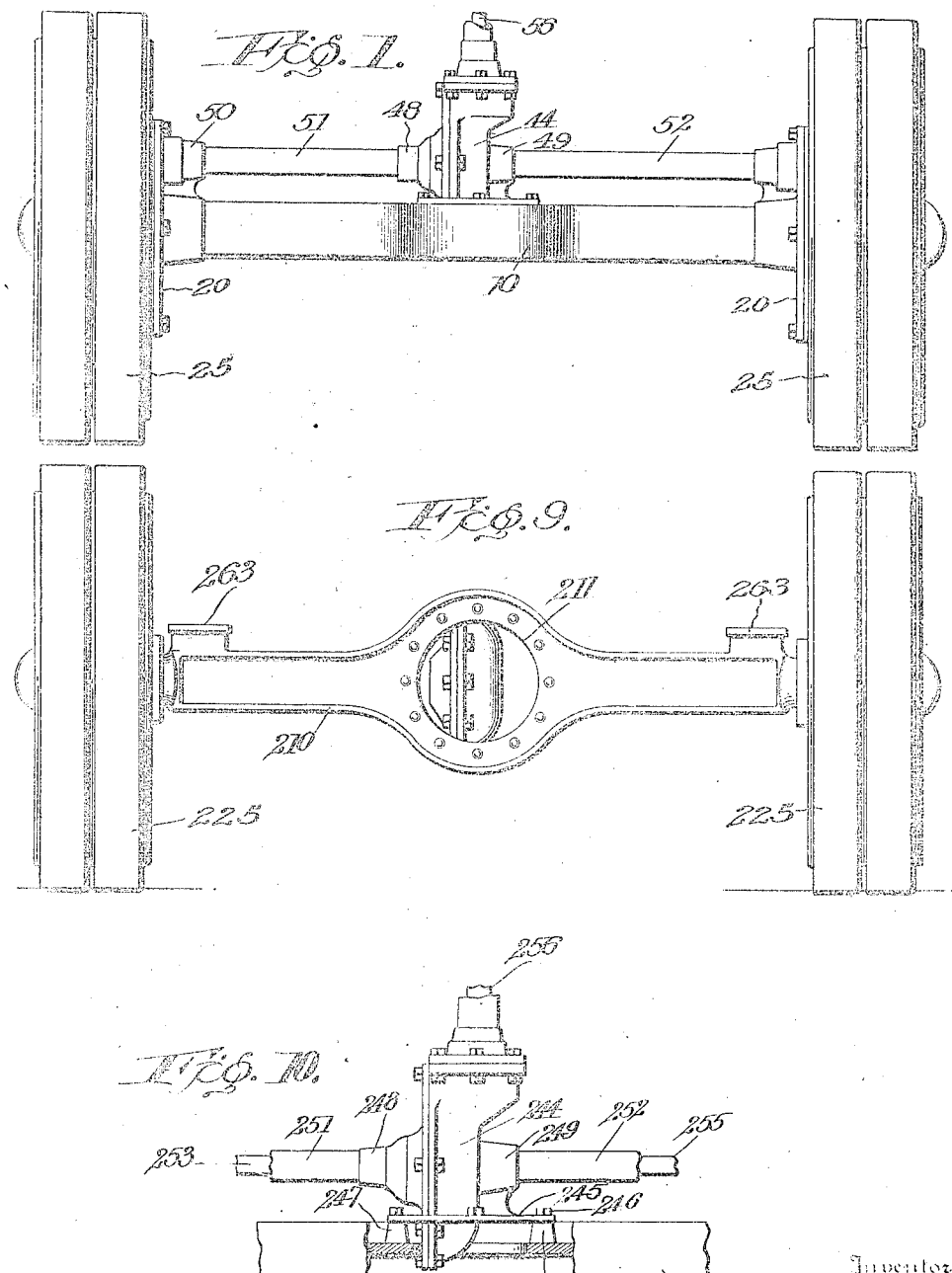

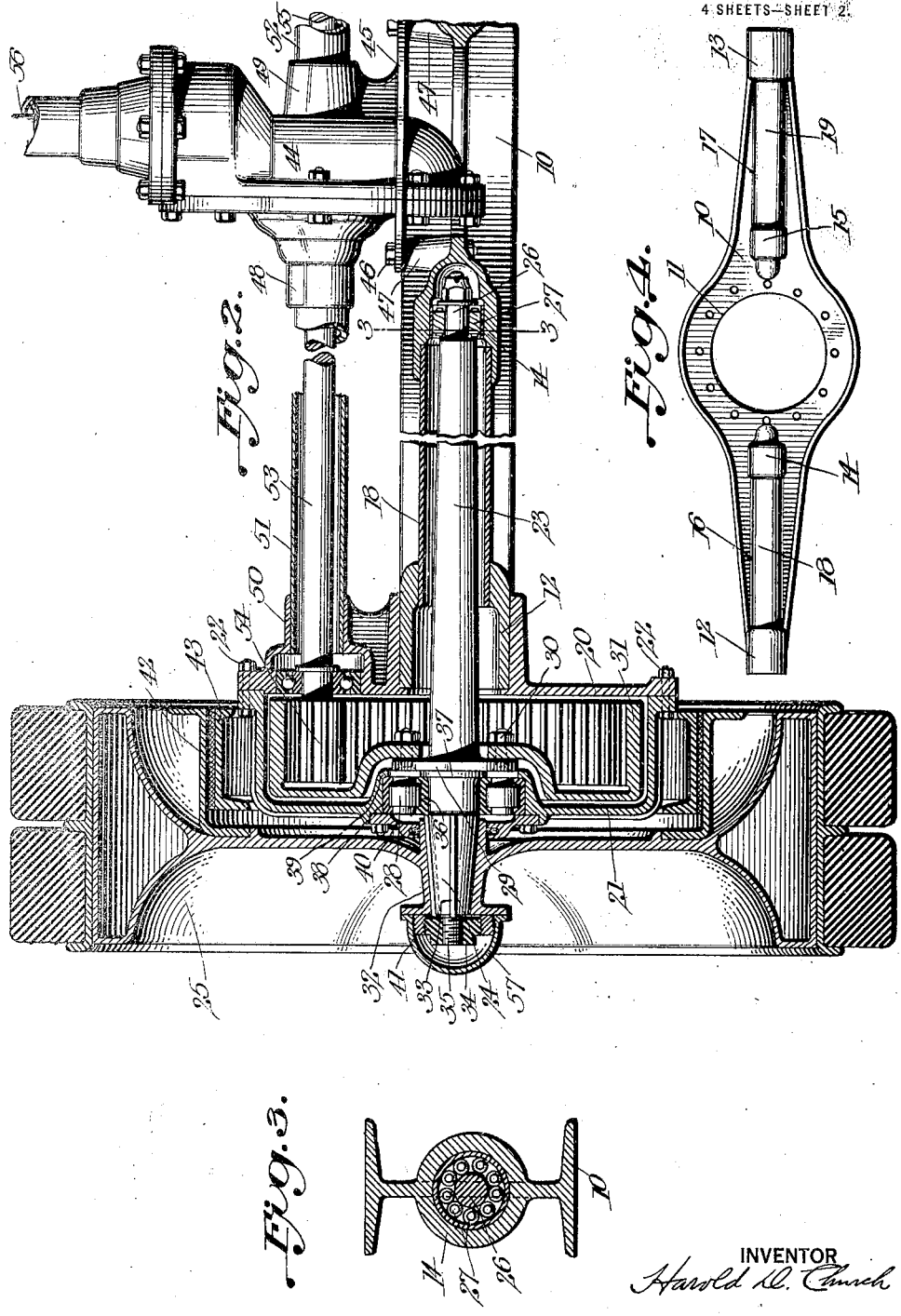

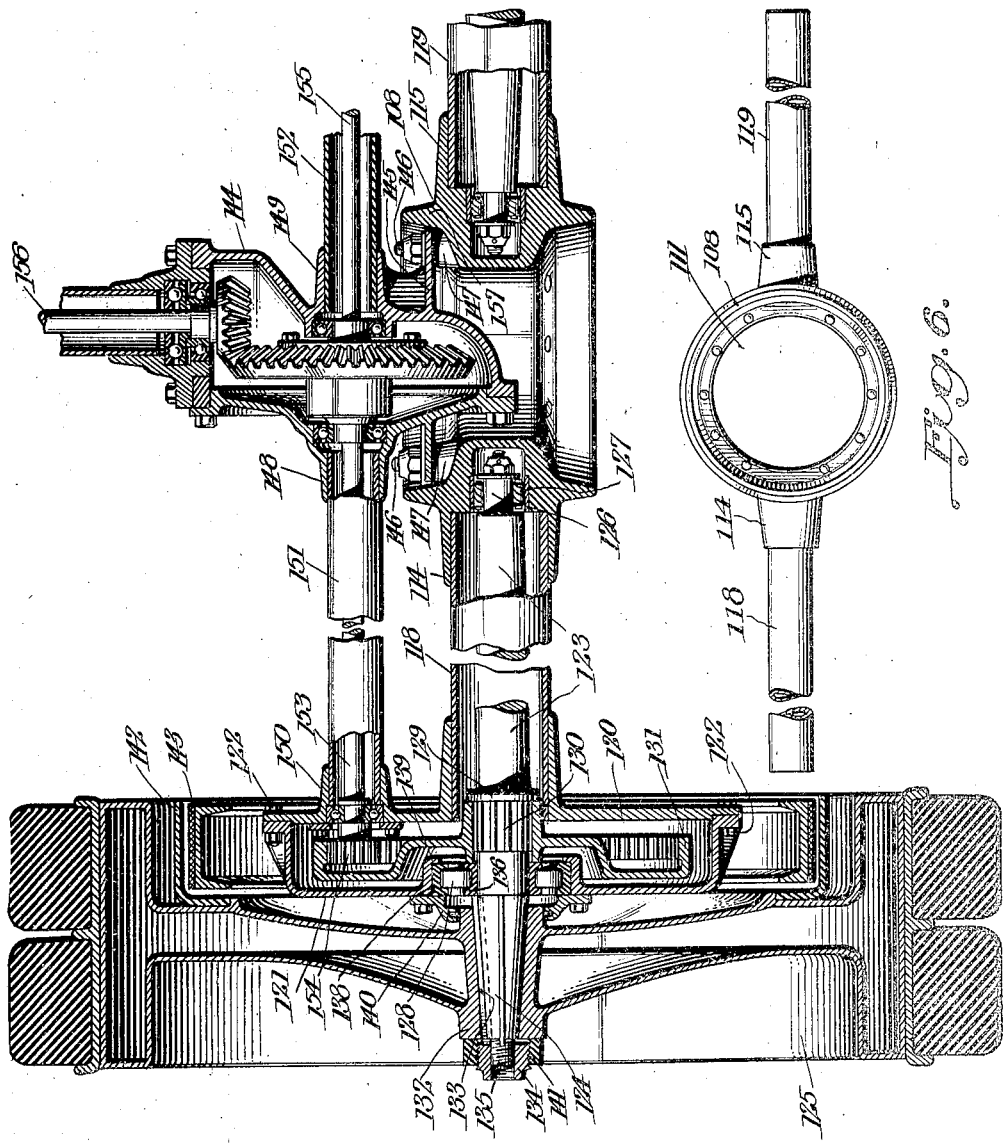

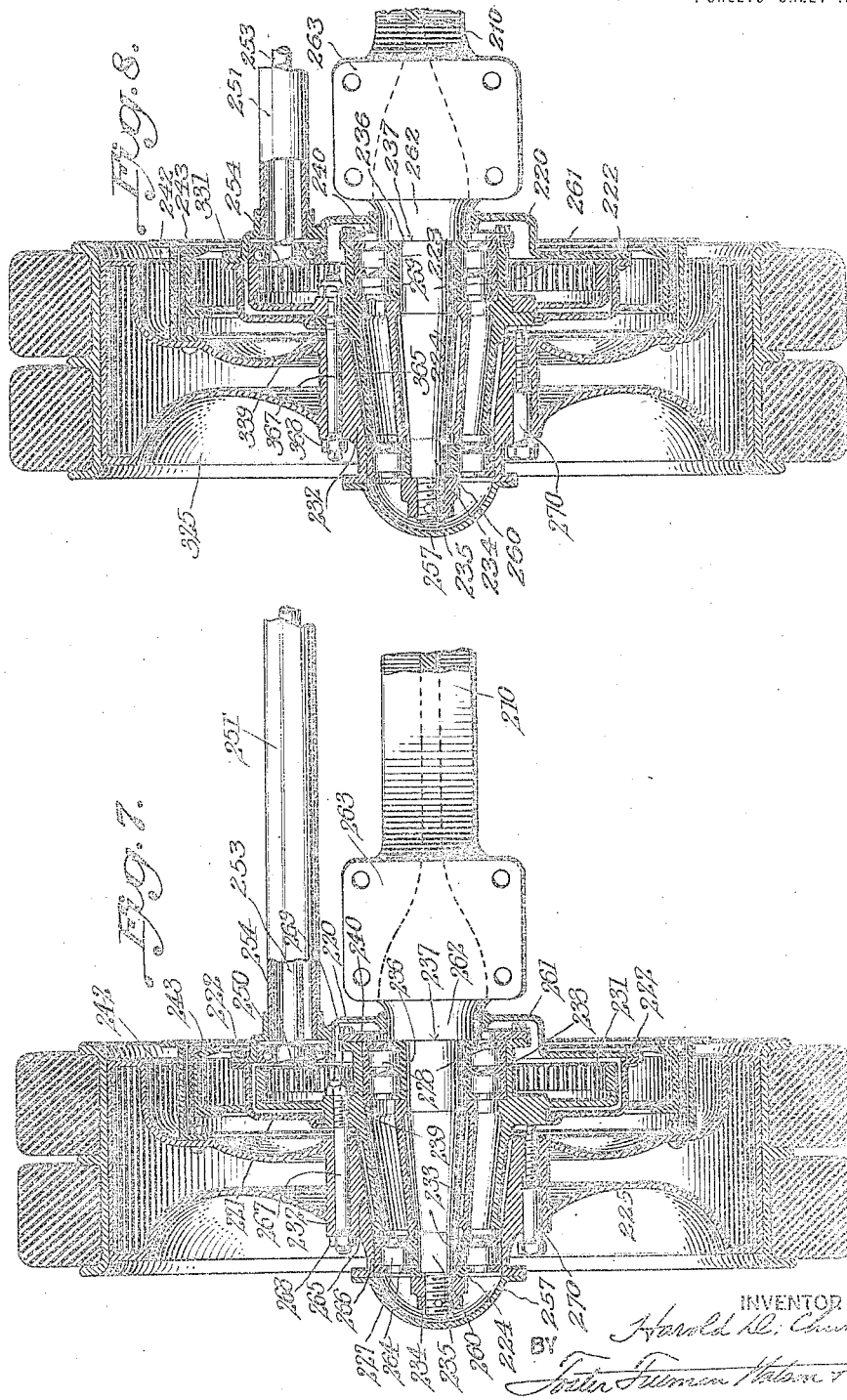

1,434,428

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 12, 1917. Serial No. 196,183.

*To all whom it may concern:*

Be it known that I, HAROLD D. CHURCH, a citizen of the United States, and residing at Detroit, Wayne County, State of Michigan, have invented certain new and useful Improvements in Motor Vehicles, of which the following is a specification.

The present invention relates to motor vehicles, and more particularly to an axle construction therefor.

In motor trucks, a strong axle giving maximum road clearance is required. To obtain sufficient road clearance, however, is difficult because of the large gear ratio required in the differential. Furthermore, when a large gear reduction is made in the differential, the shaft sections which transmit the torque from the differential to the wheels must be of large diameter in order to be strong enough to carry the torque. It has been proposed to overcome the above difficulties by locating part of the reduction gearing at the wheels. In the latter construction, there is a reduction at the differential and another reduction at the wheels, and as the driving means connecting the differential and wheel gearings is outside the load carrying member of the axle, a strong axle for a given weight is obtained. Moreover, as part of the reduction is at the wheels the means connecting the differential and wheel gearings rotates at a high speed with proportionately less torque and therefore can be of a relatively light construction. Again, as the reduction in the differential is small, the differential itself is small, thereby giving greater road clearance. If this type of design is carried to its logical conclusion, obviously the reduction at the wheels will be as great as possible in order to permit the use of a small differential. But the reduction at the wheels is limited by the requirements of design, so that, for trucks which must have a high reduction in the drive from the engine to the rear wheels, it is found that the differential is large even when the maximum reduction at the wheels is utilized.

One of the principal features of this invention consists in the provision of a strong axle construction which has means for supporting the differential gearing so that the necessary road clearance is obtained with a large differential. In addition to the limitation of the reduction at the wheels, the size of the reduction in the differential is also limited. The reduction in the differential is limited by the distance that the shaft sections connecting the differential and wheel gearings can be located radially from the center of the wheel. In an axle according to this invention, however, this limitation is removed and a differential reduction practically of any desired value may be used.

A further feature of the invention resides in the construction for mounting the wheels on the axle so that they are secured to the same for removal independently of the wheel gearing. That is to say, the wheels may be removed without in any way disturbing the wheel driving gears.

A further feature resides in the novel construction of the axle load carrying member.

Another feature consists in the provision of two widely spaced bearings for rotatively supporting each wheel on the axle load carrying member. In the type of drive involved in this invention, a gear is secured to the wheel, and if the wheel has any tilting movement about an axis perpendicular to the wheel axis, the gear has a corresponding tilting motion, which causes excessive wear and, of course, increased friction in the wheel gearing. Obviously, if the wheel bearings are close together, the looseness in the bearings permits a greater tilting of the wheel than in the case where the bearings are widely spaced.

Another feature consists in the combination and arrangement of parts whereby the wheel gearing may be located in a casing within the wheel brake drum and yet permit a large reduction ratio between the engine and wheels.

Other objects and features of novelty will be apparent from the description taken in connection with the drawings, in which:—

Figure 1 is a plan view of a portion of a motor vehicle showing one embodiment of the present invention;

Figure 2 is a sectional plan view of a portion of the structure shown in Figure 1;

Figure 3 is a sectional view taken substantially on the line 3—3 of Figure 2;

Figure 4 is an elevation of the load carrying member of the axle construction shown in Figures 1 and 2;

Figure 5 is a sectional plan view similar to Figure 2 illustrating another form of the invention;

Figure 6 is an elevation of the load carrying member of the axle construction shown in 5;

Figure 7 is a sectional plan view of a portion of an axle construction and driving wheel of another form of the invention;

Figure 8 is a sectional view similar to Figure 7 illustrating still another form;

Figure 9 is a rear elevation of the axle and wheels of the forms of the invention shown in Figures 7 and 8; and Figure 10 is a plan view, parts being shown in section illustrating the construction for securing the differential casing to the load carrying member of the axle of the form shown by Figures 7 and 8.

Referring to the drawings, and more particularly to Figures 1 to 4 inclusive, the reference character 10 indicates the load carrying member of the axle construction. As clearly shown in Figures 3 and 4, this member is of I-beam section and has its greatest depth at the central part of its length. The web of this central part is formed with an aperture 11 so that the said central part in effect may be considered as a ring. At its opposite end portions the member 10 is formed with the hollow cylindrical end parts 12 and 13 and the depth of the beam is tapered from the central part towards these end parts. Adjacent the aperture 11 and at opposite ends of a diameter thereof the web of the beam is formed with the hollow bosses or cylindrical parts 14 and 15 which are in alignment with the end parts 12 and 13. The web of the member between the boss 14 and end part 12 is cut away as at 16 and likewise the web between the boss 15 and end part 13 is cut away as at 17 to form slots. A tube or sleeve 18 is mounted in the boss 14 and end part 12, and a similar tube or sleeve 19 is mounted in the boss 15 and end part 13.

Referring now to Figure 2 it will be seen that an end plate 20 is mounted on the end part 12 of the load carrying member and this plate is secured to the member against rotation in any desired manner as by being shrunk thereon. A casing member 21 is secured to the plate 20 as by means of bolts 22 so that the plate 20 and member 21 form an oil tight casing or housing for the wheel driving gears. A wheel carrying shaft 23 is arranged in the tube 18 and extends through the gear casing, and on the tapered end 24 thereof carries the vehicle wheel 25. This shaft has its inner end 26 reduced and mounted in a bearing 27 carried by the boss 14. Another bearing 28 for the shaft is interposed between the inner edge of the casing member 21 and the shaft. Adjacent this latter bearing the shaft is formed with a radial flange 29, to which is secured by means of the bolts 30, the internal gear 31. The hub 32 of the vehicle wheel is formed with a conical bore which receives the conical end 24 of the wheel carrying shaft. The wheel is secured to the shaft for rotation therewith by means of the keys 33. These keys are of such length that when the nut 34 is screwed on the reduced end 35 of the shaft their inner ends will be forced against the inner race 36 of the bearing 28, thereby in turn forcing the race against the shoulder 37 formed on the shaft. The outer race 38 of the bearing 28 is secured against longitudinal movement at the inner edge of the casing member 21 by means of the lip 39 and the removable plate 40. The wheel is held on the tapered end 24 of the shaft by means of the nut 41 threaded on the periphery of the nut 34.

It will be seen that the outer race ring 38 of the bearing 28 is held against longitudinal movement relative to the axle, and the inner race ring 36 is secured against movement along the shaft 23 by the shoulder 37 at one side and the keys 33 at the other side. Hence this arrangement of the bearing 28 takes up the thrust of the wheel in both directions. Thus, if the wheel is thrust toward the right, as viewed in Figure 2, the force of the thrust will be carried to the wheel carrying shaft, thence through the keys 35 to the inner race ring 36 of the bearing, thence through the rollers of the bearing to the outer race ring 38 which is secured against movement in the gear casing fast on the load carrying member of the axle. In a similar manner if the wheel is thrust towards the left, as viewed in Figure 2, the force thereof will be transmitted to the shaft and through the shoulder 37 to the inner race ring 36 of the bearing 28, thence through the rollers to the outer race ring 38, which is secured against movement.

The vehicle wheel may be provided with the usual brake drum 42 with which a brake band 43 is adapted to cooperate. It will be seen that the arrangement of the parts is such that the gear casing is mounted so that it is radially within the brake drum of the wheel. Consequently, the gear casing is protected to a considerable extent from stones and other objects which might be thrown against the same if it were not arranged within the brake drum. Furthermore, the above described arrangement of parts permits the bearing 28 to be located very close to and almost in the transverse plane with the internal gear 31. It is desirable to have the bearing 28 as nearly as possible in the plane of the gear 31 so as to eliminate the moment tending to turn the gear transversely, this moment being due to the thrust of the gears on each other.

The differential casing 44 is provided with a circular flange 45 which is secured to the web of the load carrying member by means of bolts 46, the flange being spaced from the web of the member as may be required by the spacing members 47. It will be seen that by providing the aperture 11 in the web of the axle member 10 and increasing the depth thereof at the central part that the differential casing 44 is permitted to extend through the aperture 11, thus allowing the use of a differential which has a high reduction. Furthermore, although the web of the axle member is cut away at 11, yet the strength of the member is not decreased as the added depth more than compensates for the web cut away.

The differential casing on opposite sides thereof is formed with the hollow bosses 48 and 49. The end plate 20 of the wheel gear casing is provided with a hollow boss 50 which is aligned with the boss 48 and a tube or sleeve 51 is mounted in these two bosses. A similar tube 52 extends from the boss 49 to the opposite gear casing. For the purpose of rotatively connecting the differential and the wheel 25, the shaft 53 extends from the differential through the tube 51 and into the wheel gear casing, and has on the end thereof within the said casing a pinion 54, which meshes with the annular gear 31. A similar shaft 55 extends to the other wheel.

It is to be understood that although Figure 2 shows only one wheel and a little more than half of the axle construction, the parts on the right hand side of the differential, as viewed in Figure 2, are the same as the parts shown on the left hand side thereof, and hence illustration thereof in detail is not necessary.

In the operation of the parts described, the shaft 56 driven by the vehicle motor, through the differential rotates the shafts 53 and 55, thereby through the wheel gearings driving the wheels. It will be observed that Figure 2 illustrates a gear reduction at the wheel which is of as large a value as can be obtained with the gearing arranged within the brake drum. Furthermore, because of the method of attaching the differential casing to the load carrying member, a differential having a high gear reduction may be used as the size of the casing is not limited by the distance between the axis of the shaft 53 and the load carrying member of the axle. The aperture 11 in the load carrying member permits the differential casing to project through the web of the member so that a large casing, and consequently a large gear reduction in the differential may be used. In addition to the feature just described, the vehicle wheel may be removed from the axle without in any way disturbing the wheel gearing. For this purpose, the nuts 41 and 34 on the end of the wheel carrying shaft 23 are removed, whereupon the wheel may be withdrawn from the end of the shaft. The removal of the said nuts and protecting cap 57 is all that is necessary to take off the wheel. Then the tires may be replaced or the brake apparatus repaired as may be required. If it is necessary to get at the gearing, then the bolts 22 which connect the two casing members are unscrewed, whereupon the shaft 23 with the attached internal gear 31 and the casing member 21, may be withdrawn as a unit.

Referring to the form of the invention illustrated by Figures 5 and 6, it will be seen that the load carrying member of the axle is of a built-up construction and comprises the central ring or yoke 108, which has mounted therein the oppositely extending tubes 118 and 119. For the purpose of carrying these tubes the ring at opposite ends of a diameter thereof is formed with the hollow bosses or cylindrical parts 114 and 115. A casing end plate 120 is mounted on the end of the tube 118 of the load carrying member and this plate is secured to the tube against rotation in any desired manner, as by being shrunk thereon. A casing member 121 is secured to the plate 120 as by means of bolts 122, so that the plate 120 and member 121 form an oil-tight casing or housing for the wheel driving gears. A wheel carrying shaft 123 is arranged in the tube 118, and extends through the gear casing, and on the tapered end 124 thereof carries the vehicle wheel 125. This shaft has its inner end 126 reduced and mounted in a bearing 127 carried by the ring 108. Another bearing 128 for the shaft is interposed between the inner edge of the casing member 121 and the shaft. A wheel driving gear 131 is arranged within the gear casing, and is mounted on the shaft 123 for rotation therewith, as by means of the keys 130. One end of the hub of this gear abuts the bearing 128 and the other end abuts the flange 129 formed on the shaft. The hub 132 of the vehicle wheel is formed with a conical bore which receives the conical end 124 of the wheel carrying shaft. The wheel is secured to the shaft for rotation therewith by means of the keys 133. These keys are of such length that when the nut 134 is screwed on the reduced end 135 of the shaft, the inner ends of said keys will be forced against the inner race ring 136 of the bearing 128. Thus the inner race ring is secured against movement along the shaft in one direction by the hub of the gear 131 acting against the shoulder 129 on the shaft, and in the other direction by the keys 133. The outer race 138 of the bearing 128 is secured against longitudinal movement at the inner edge of the casing member 121 by means of the lip 139 and the removable plate 140. The wheel is held on the tapered end 124 of the shaft by means of the nut 141 threaded on the periphery of the nut 134.

It will be seen that this construction is such that the bearing 128 takes up the thrust of the wheel in both directions. Thus, if the wheel is thrust towards the right, as viewed in Figure 5, the force of the thrust will be carried to the wheel carrying shaft, thence through the keys 133 to the inner race ring 136 of the bearing, thence through the rollers of the bearing to the outer race ring 138, which is secured against movement in the gear casing fast on the load carrying member of the axle. In a similar manner, if the wheel is thrust towards the left, as viewed in Figure 5, the force thereof will be transmitted to the shaft and through the flange 129, the hub of the gear 131 to the inner race ring 136 of the bearing 128, and thence through the rollers to the outer race ring 138, which is secured against movement.

The vehicle wheel may be provided with the usual brake drum 142 with which a brake band 143 is adapted to cooperate. It will be seen that the arrangement of the parts is such that the gear casing is arranged so that it is radially within the brake drum of the wheel. Consequently, the gear casing is protected more or less by the brake drum. Furthermore, the above described arrangement of parts permits the bearing 128 to be located close to and almost in the transverse plane with the internal gear 131. It is desirable to have the bearing 128 as nearly as possible in the plane of the gear 131 so as to eliminate the moment tending to turn the gear transversely, this moment being due to the thrust of the gears on each other.

The differential casing 114 is provided with a circular flange 145, which is secured to the ring 108 of the axle load carrying member by means of bolts 146, the flange 145 being seated against the lugs 147 formed on the ring, and being surrounded by a lip or flange 157 forming part of the ring. It will be seen that by forming the load carrying member of the axle with the central ring member having the aperture 111, the differential casing 144 is permitted to extend through the said aperture, thus allowing the use of a differential which has a high reduction. Furthermore, although the load carrying member of the axle is formed with an aperture such as 111 for the gear casing, nevertheless, the strength of the member is not decreased as the added depth more than compensates for the material cut away. The differential casing on opposite sides thereof is formed with the hollow bosses 148 and 149. The end plate 120 of the wheel gear casing is provided with a hollow boss 150, which is aligned with the boss 148 and a tube or sleeve 151 is mounted in these two bosses. A similar tube 152 extends from the boss 149 to the opposite gear casing. For the purpose of rotatively connecting the differential with the wheel 125, the shaft 153 extends from the differential through the tube 151 and into the wheel gear casing, and has on the end thereof within the said casing a pinion 154 which meshes with the annular gear 131. A similar shaft 155 extends to the other wheel.

It is to be understood that although Figure 5 shows only one wheel and a little more than half of the axle construction, the parts on the right-hand side of the differential, as viewed in said figure, are the same as the parts shown on the left-hand side thereof, and hence illustration in detail is not necessary.

In the operation of this form of the invention, the shaft 156, driven by the vehicle motor, through the differential, rotates the shafts 153 and 155, thereby driving the wheels through the wheel gearings. It will be observed that Figure 5 illustrates a gear reduction at the wheel which is of nearly as large a value as can be obtained with the gearing arranged within the brake drum. Furthermore, because of the method of attaching the differential casing to the axle carrying member, a differential having a high gear reduction may be used as the size of the casing is not limited by the distance between the axis of the shaft 153 and the load carrying member of the axle. The aperture 111 in the load carrying member permits the differential casing to project through the said member so that a large casing, and consequently a large gear reduction in the differential, may be used. In addition to the feature just described, the vehicle wheel may be removed from the axle without in any way disturbing the wheel gearing. For this purpose, the nuts 141 and 134 on the end of the wheel carrying shaft 123 are removed, whereupon the wheel may be withdrawn from the end of the shaft. The removal of said nuts is all that is necessary to take off the wheel. Then with the wheel removed, the tires may be replaced or the brake apparatus repaired, as required. If it is necessary to get at the gearing, then the bolts 122 which connect the two casing members are unscrewed whereupon the shaft 123 with the attached internal gear 131 and the casing 121 may be withdrawn as a unit.

Referring now to the form of the invention shown by Figures 7, 8, 9 and 10, it will be seen that the load carrying member 210 of the axle construction is a solid member which extends from wheel to wheel and carries the wheels on the ends thereof. As shown in the drawings, this member is of I-beam section and has its greatest depth at the central part of its length. The web of this central part is formed with an aperture 211 so that the said central part in effect may be considered as a ring. The ends of the member 210 are each formed with a reduced threaded portion 235, the cylindrical portion 260, conical portion 224 connected to the cylindrical portion 260 and then the enlarged cylindrical portion 261, which is adjacent the pad 263 to which a spring may be secured. An end plate 220 is mounted on the cylindrical portion 262 of the load carrying member and this plate is secured to the member against rotation in any desired manner as by being shrunk thereon. A casing member 221 is secured to the plate 220, as by means of bolts 222, so that the plate 220 and member 221 form an oil tight casing or housing for the wheel driving gears. A roller bearing 227 is mounted on the cylindrical portion 260 and another roller bearing 228 on the cylindrical portion 261 of the load carrying member. Interposed between the inner race ring 262 of the bearing 227 and the inner race ring 236 of the bearing 228 is a conical sleeve 233. The arrangement of the parts is such that the nut 234 screwed on the threaded end 235 of the axle member thrusts the race ring 264 against the sleeve 233 which in turn thrusts the race ring 236 against the shoulder 237 formed by the enlarged cylindrical portion 262. An internal gear 231 is arranged within the gear casing and is formed with a projecting hub which is mounted on the outer race ring 238 of the bearing 228. For the purpose of preventing longitudinal movement of the gear with respect to the bearing, the hub is provided with the internal lip 239 which abuts one end of the outer race ring and the removable ring 240 which abuts the other end of said race ring. Projecting from the opposite side of said gear, with respect to the portion just described, is a conical sleeve 265 which carries a wheel 225 of the vehicle. For this purpose the wheel is provided with a hub 232 which is formed with a bore having a conical portion adapted to take over the conical sleeve 265 and with a circular portion 266 adapted to receive the outer race ring of the bearing 227. In order to secure the wheel to the gear 231 for rotation therewith, the gear is provided with a circular series of bolts 267, which are threaded in a portion of the gear just outside its hub and extend through the hub 232 of the wheel. The opposite ends of the bolts 267 have the nuts 268 and 269 screwed thereon for securing the wheel and gear against relative longitudinal movement. It will be seen that the above described arrangement of parts associated with the bearing 228 takes up the thrust of the wheel in both directions. Thus if the wheel is thrust towards the right, as viewed in Figure 7, the force of the thrust will be carried to the conical sleeve 265 of the internal gear adjacent to the outer race ring 238 of the bearing 228, through the rollers and inner race ring of the bearing to the shoulder 237 of the axle. In a similar manner if the wheel is thrust towards the left, as viewed in Figure 7, the force thereof will be transmitted through the bearing 228 to the inner race ring 236, thence through the conical sleeve 233, the inner race ring 264 of the bearing 227 to the nut 234 on the axle.

The vehicle may be provided with the usual brake drum 242 with which the brake band 243 is adapted to cooperate. It will be seen that the arrangement of the parts is such that the gear casing is mounted so that it is radially within the brake drum of the wheel. Consequently, the gear casing is protected to a considerable extent against heating protruding objects. Furthermore, the above described arrangement of parts permits the bearing 228 to be located substantially in the transverse plane with the internal gear 231. It is desirable to have this bearing as near as possible in the plane of the gear 231 so as to eliminate the moment tending to turn the gear transversely, this moment being due to the thrust of the gears on each other.

As shown in Figure 10, the differential casing 244 is provided with a circular flange 245, which is secured to the load carrying member of the axle by means of the bolts 246, the flange being spaced from the web of the member as may be required by the lugs or spacing members, 247. It will be seen that by providing the aperture 211 in the web of the axle member 210 and increasing the depth thereof at the central part, the differential casing 244 is permitted to extend through the aperture 211, thus allowing the use of a differential which has a high reduction. Furthermore, although the web of the axle member is cut away at 211, the strength of the member is not decreased as the added depth more than compensates for the web cut away.

The differential casing on opposite sides thereof is formed with the hollow bosses 248 and 249. The end plate 220 of the wheel gear casing is provided with a hollow boss 250, which is aligned with the boss 248 and a tube or sleeve 251 is mounted in these two bosses. A similar tube 252 extends from the boss 249 to the opposite gear casing. For the purpose of rotatively connecting the differential and the wheel 225, the shaft 253 extends from the differential through the tube 251 and into the wheel gear casing, and has on the end thereof within the said casing, a pinion 254 which meshes with the annular gear 231. A similar shaft 255 extends to the other wheel.

It is to be understood that Figure 10 illustrates the differential casing and portion of the axle which goes with Figures 7 or 8 and that although only one wheel is illustrated the parts on the right-hand side of the differential, as viewed in Figure 10, are the same as the parts on the left-hand side shown by Figures 7 or 8, and hence illustration thereof is not necessary.

The form of the invention illustrated by Figure 8 is the same as that shown by Figure 7 except that the internal gear 331 is not formed integral with the conical sleeve 365, as is shown by Figure 7. For the purpose of connecting the internal gear 331 and the vehicle wheel 325, the conical sleeve 365 is formed with the radial flange 339, which at one side thereof carries the annular gear 331 and has threaded therethrough the circular series of bolts 367. Each of these bolts extends through the hub 232 of the wheel, and has a nut 268 on the corresponding end thereof. The other end of each bolt extends through the annular gear 331, and a nut 269 secures the said gear against the flange 339.

In the operation of the parts shown by Figures 7, 8 and 10, the shaft 256 driven by the vehicle motor through the differential rotates the shafts 253 and 255, thereby through the wheel gearings driving the wheels. It will be observed that Figures 7 and 8 illustrate a gear reduction at the wheels which is of as large a value as can be obtained with the gearing arranged within the brake drum. Furthermore, because of the method of attaching the differential casing to the load carrying member of the axle, a differential having a high gear reduction may be used as the size of the casing is not limited by the distance between the axis of the shaft 253 and the load carrying member of the axle. The aperture 211 in the load carrying member permits the differential casing to project through the web of the member so that a large casing, and consequently, a large gear reduction in the differential may be used. In addition to the feature just described, the vehicle wheel may be removed from the axle without in any way disturbing the wheel gearing. For this purpose the nuts 268 are removed whereupon the wheel may be withdrawn from the conical sleeve 265 by screwing up the set screw 270 which is carried in the hub of the wheel, and has its inner end in contact with the radial flange on the said conical sleeve. If it is necessary to get at the gearing, then the nut 234 and cap 257 on the end of the axle are unscrewed and the bolts 222 connecting the casing members removed whereupon all the parts carried by the end of the axle except the casing plate 220 may be taken off. In the form of the invention shown by Figure 7, if a new internal gear is required, of course the attached hub and conical sleeve must also be furnished, whereas in the form shown by Figure 8, as the gear is detachable from the hub, only the detachable portion need be replaced.

It is understood that although several embodiments of the invention have been described specifically, yet the details thereof may be varied within the scope of the attached claims.

Having thus described the invention what is claimed as new and desired to be secured by Letters Patent is:—

1. In combination with a motor vehicle, an axle construction including a load carrying member, a rotatably mounted shaft projecting from an end of said member and substantially coaxial therewith, a road wheel having its hub removably secured on the end of said shaft for rotation therewith, and means to drive said wheel including a gear disposed at the inner side of said wheel and secured to said shaft, the wheel being removable without disturbing the gear.

2. In combination with a motor vehicle, an axle construction comprising a load carrying member, a wheel carrying shaft coaxial with said member and having an inner bearing adjacent the center of said member and an outer bearing adjacent the end of said member, a wheel removably secured to the end of said shaft for rotation therewith, and a driving gear secured to said shaft adjacent the outer bearing.

3. In combination with a motor vehicle, an axle construction comprising a load carrying member, a wheel carrying shaft coaxial with said member and having an inner bearing adjacent the center of said member and an outer bearing adjacent the end of said member, a wheel removably secured to the end of said shaft for rotation therewith, a driving gear, and means securing said gear to said shaft on the inner side of the outer of said bearings.

4. In combination with a motor vehicle, an axle construction comprising a load carrying member, a wheel carrying shaft coaxial with said member and having an inner bearing adjacent the center of said member and an outer bearing adjacent the end of said member, a wheel having its hub removably secured to the end of said shaft for rotation therewith, and a gear secured to said shaft, said outer bearing being disposed between said hub and gear.

5. In combination with a motor vehicle, an axle construction comprising a load carrying member, a wheel carrying shaft coaxial with said member and having an inner bearing adjacent the center of said member and an outer bearing adjacent the end of said member, a wheel removably secured to the end of said shaft for rotation therewith, and a driving gear secured to said shaft adjacent the outer bearing, differential gearing carried by the axle, and a shaft connecting the differential gearing and said drive gear, the axis of the latter shaft and the differential gearing being outside said member.

6. In combination with a motor vehicle, an axle construction comprising a load carrying member formed to carry a differential casing, a casing at one end of said member, a wheel carrying shaft rotatably mounted in said axle having a bearing adjacent the center of the said member and another bearing in the casing, a wheel on said shaft, and means independent of said shaft for driving the wheel.

7. In combination with a motor vehicle, an axle construction comprising a load carrying member formed to carry a differential casing, a casing at one end of said member, a wheel carrying shaft rotatably mounted in said axle having a bearing adjacent the center of the said member and another bearing in the casing, a wheel on said shaft, and means independent of said shaft for driving the wheel including gearing in said casing.

8. In combination with a motor vehicle, an axle construction comprising a load carrying member formed to carry a differential casing, a casing at one end of said member, a wheel carrying shaft rotatably mounted in said axle having a bearing adjacent the center of the said member and another bearing in the casing, a wheel on said shaft, means independent of said shaft for driving the wheel and means for securing the wheel to the shaft for removal independently of the driving means.

9. In combination with a motor vehicle, an axle construction including a load carrying member and a wheel at one end thereof, a casing close to the wheel, a differential device carried by said member, a shaft extending from the differential device into the casing, a second shaft substantially coaxial with said member gearing within the casing connecting said shafts, said differential device and associated shaft being outside said member, and means for securing the wheel to said second shaft for removal independently of said gearing.

10. In combination with a motor vehicle, a rear axle construction, including a central member adapted to support a differential casing, a tube projecting from said member, a casing at the end of said tube, a wheel, a shaft rotatably mounted in said tube and casing and carrying said wheel, means for driving said wheel including gearing in said casing and means for securing said wheel on said shaft for removal independently of said gearing.

11. As an article of manufacture, an integral load carrying axle member of I-beam section comprising a central part, the depth of the member being tapered from said part toward each end, a hollow cylindrical part at each end, and a hollow cylindrical boss at each of the opposite ends of a diameter of said central part aligned with the said end parts, the web of the member between each end part and the adjacent boss being formed with a slot.

12. As an article of manufacture, a load carrying axle member of I-beam section, comprising a central part, the depth of the member being tapered from said part toward each end, a hollow cylindrical part at each end, a hollow cylindrical boss at each of the opposite ends of a diameter of said central part aligned with the said end parts, the web of the member between each end part and the adjacent boss being formed with a slot, a gear casing mounted on each end part and a tube mounted in each end part and adjacent boss.

13. In combination with a motor vehicle, an axle construction comprising a load carrying member of I-beam section having a central part, the depth of the member being tapered from the said part toward each end, a hollow cylindrical part at each end, a hollow cylindrical boss at each of the opposite ends of a diameter of said central part aligned with the said end parts, the web of the member between each end part and the adjacent boss being formed with a slot, a gear casing mounted on each end part, a tube mounted in each end part and adjacent boss, a wheel carrying shaft mounted in each tube and projecting from the corresponding end of the member, a wheel on the projecting end of each shaft, gearing in the casing for driving the associated wheel, and means for securing each wheel to its shaft for removal independently of the gearing.

14. In combination with a motor vehicle, an axle, a wheel on the end of the axle, a roller bearing for taking the side thrust of the wheel, and means for securing said bearing against longitudinal movement relative to the axle including a shoulder formed on the axle at one side of the bearing, a nut on the end of the axle and a member interposed between the nut and the other side of the bearing.

15. In combination with a motor vehicle, an axle having a rotatable shaft projecting at one end, a wheel on said end, means for securing said shaft against longitudinal movement including a roller bearing held against longitudinal movement relative to the axle, said shaft having a shoulder at one side of the bearing, a nut on the end of the shaft, and a key for securing the wheel to the shaft interposed between said nut and the other side of the bearing.

16. In combination with a motor vehicle, an axle construction including a load carrying member, a rotatable member, substantially coaxial with the load member, means for driving said rotatable member including a gear at one end of the axle detachably secured to said rotatable member, a road wheel, and means for securing the wheel to the rotatable member for removal independently of the said gear.

17. In combination with a motor vehicle, an axle, a road wheel, means for driving the wheel including a gear at the end of the axle, and means for rotatively supporting the wheel on the axle including two bearings one substantially in the plane of the gear and the other adjacent the center of the axle.

18. In combination with a motor vehicle, an axle, a road wheel, means for driving the wheel including a gear at the end of the axle, and means for rotatively supporting the wheel and gear on the axle including two bearings one substantially in the plane of the gear and the other adjacent the center of the axle.

In testimony whereof I affix my signature.

HAROLD D. CHURCH.